United States Patent

Russo, Sr.

[11] Patent Number: 5,390,932
[45] Date of Patent: Feb. 21, 1995

[54] METHOD FOR MAKING LIKE-NEW GOLF BALLS FROM RECLAIMED GOLF BALLS

[76] Inventor: Robert F. Russo, Sr., 16428 N. 66th St., Scottsdale, Ariz. 85254

[21] Appl. No.: 104,176

[22] Filed: Aug. 9, 1993

Related U.S. Application Data

[63] Continuation-in-part of Ser. No. 940,975, Sep. 4, 1992, abandoned.

[51] Int. Cl.⁶ ............... A63B 37/06; A63B 37/12
[52] U.S. Cl. .................... 273/220; 273/235 R; 427/140; 264/36; 29/899; 29/402.18; 29/402.08; 156/98; 156/146; 156/154
[58] Field of Search ........... 273/60 R, 60 A, 60 B, 273/58 A, 62, 218, 220, 230, 232, 235 R, 235 B, 82, 235 A, 233, 234, 217; 29/402.01, 402.06, 402.08, 402.18, 899, 899.1; 156/94, 98, 153, 154, 146; 427/140; 264/36

[56] References Cited

U.S. PATENT DOCUMENTS

| 2,015,165 | 9/1935 | Twiss et al. | 273/235 A |
| 2,021,042 | 11/1935 | Bayon | 273/235 R |
| 2,090,256 | 8/1937 | Heintz | 273/235 R |
| 3,419,949 | 1/1969 | Huebner | 273/235 R |
| 4,904,320 | 2/1990 | Isaac et al. | 273/231 X |
| 4,998,734 | 3/1991 | Meyer | 273/235 R |
| 5,049,413 | 9/1991 | Gibson | 427/140 |

Primary Examiner—George J. Marlo
Attorney, Agent, or Firm—Juettner Pyle Lloyd & Piontek

[57] ABSTRACT

Like-new golf balls are made from used golf balls by first reducing the diameter of the used ball, to provide an intermediate ball, and then molding a new dimpled cover on the ball. The diameter of the used ball is uniformly reduced by compression molding or by grinding.

5 Claims, 4 Drawing Sheets

METHOD FOR MAKING LIKE-NEW GOLF BALLS FROM RECLAIMED GOLF BALLS

CROSS REFERENCE

This is a continuation-in-part of U.S. patent application Ser. No. 07/940,975, filed Sep. 4, 1992, now abandoned.

BACKGROUND OF THE INVENTION

This invention relates to the manufacture of like-new golf balls wherein a portion of a discarded or reclaimed golf ball is used as the core of the like-new ball.

Conventional methods of manufacturing golf balls involve the steps of first producing a cured elastomer core, followed by molding a durable dimpled cover around the core. The core itself may be formed from a solid and homogenous elastomer, which is cured in a spherical mold to provide a spherical core, for example, as disclosed in U.S. Pat. No. 5,072,944. Another type of core comprises an inner or central core filled with liquid, with the central core having an outer layer of elastomer windings, such as, for example, described in U.S. Pat. No. 4,943,332.

A dimpled cover is molded onto the core by one of two known methods. In the compression molding method, a pair of semispherical cover blanks or shells of polymer material are disposed around the core, and the assembly is placed in a mold comprising a pair of closeable mold halves defining a spherical dimpled cavity. The mold halves are compressed and heated, causing the cover material to become plastic and to be molded into a continuous dimpled cover around the core. Excess cover material escapes through sprues at the mold parting line. Both thermoplastic polymers, such as ionomers, and thermoforming elastomers such as synthetic rubbers, are used for this purpose. An early description of this process may be found in U.S. Pat. No. 2,787,024.

Another method of forming a cover of a golf ball is by injection molding. In this method, the core is first centered in the mold by retractable pins, and molten thermoplastic cover material is injected at high pressure around the cores to provide a cover. The mold is then cooled, and the balls are ejected from the mold.

After a golf ball has been in use for a period of time, the cover becomes scratched, deformed, or discolored, and the ball must be discarded. While some used golf balls may be cleaned and reused, it is estimated that many millions become too damaged each year and are discarded. Discarded golf balls are not biodegradable and therefore become a permanent part of the environment.

SUMMARY OF THE INVENTION

It has been discovered that used golf balls, even those with damage to the cover, can be restored to a like-new condition. Even if the cover of the ball is in poor condition, the central core is still usually intact and in good condition, and the core is the most expensive component of a new ball.

In accordance with the present invention, the outer diameter of a used ball is first uniformly reduced from the original diameter to a smaller diameter. This is accomplished preferably by compression molding of the ball in a spherical mold, or alternatively, by abraiding, such as centerless grinding. The reduced diameter ball, which still has a thin layer of cover of the original ball, is provided with a new cover by conventional molding techniques, and any necessary finishing operations are then performed.

The resulting reconstituted ball, comprising the reclaimed core and new cover, has the appearance and properties of a new ball. The ball meets all standards as may be applicable, such as the weight and diameter and other properties of golf balls prescribed by the United States Golf Association.

The reclaimed golf ball of the present invention is inexpensive to produce because the used or discarded golf balls are low in price, and the new cover portion is relatively inexpensive. The ball may be recycled indefinitely, and any desired cover material and dimple pattern may be used. Even if the ball is not sold as a freshly manufactured ball, it may still be used to play golf or used at practice or putting facilities.

THE DRAWINGS

DESCRIPTION OF THE PREFERRED EMBODIMENT

Figure 1:
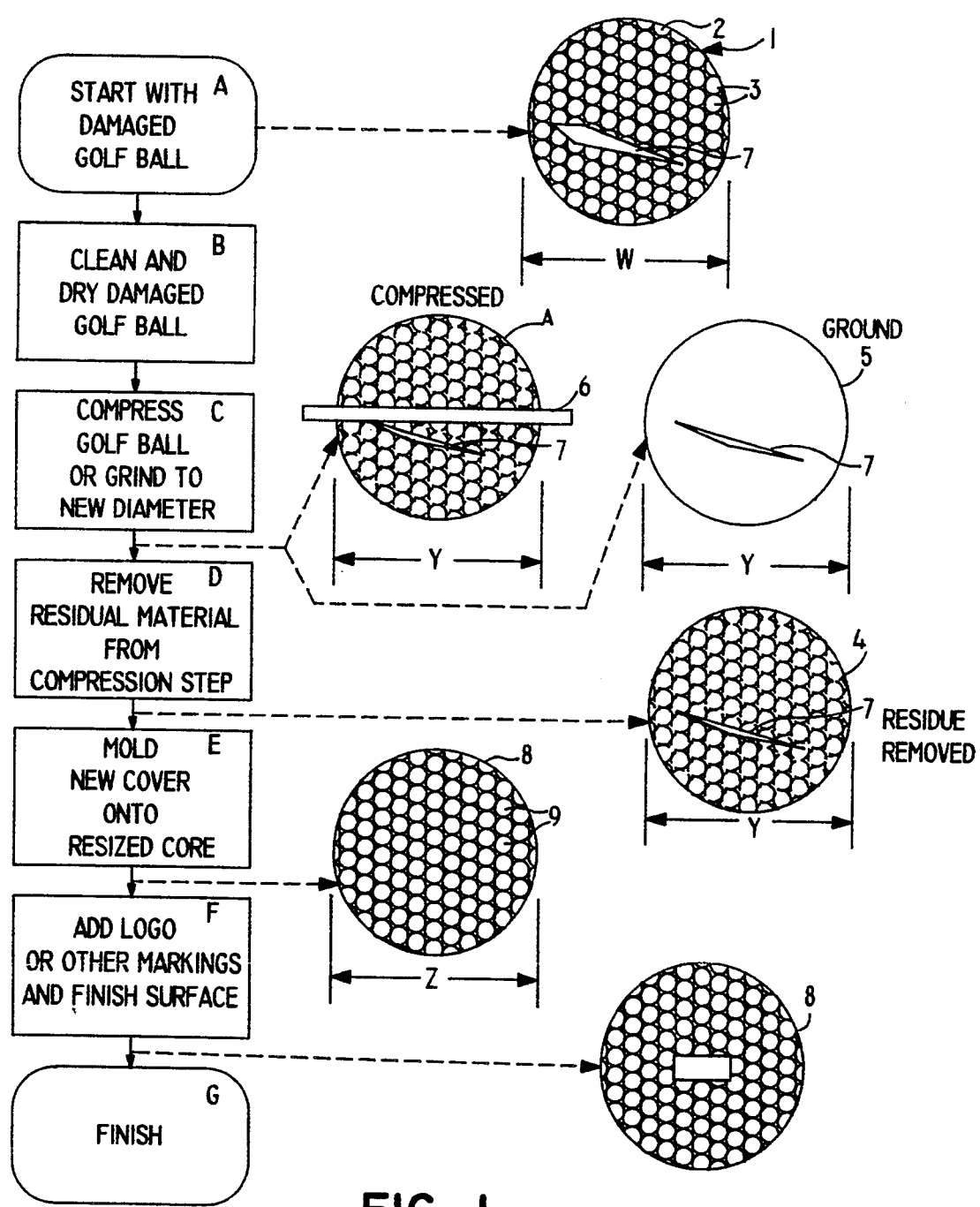
FIG. 1 is a schematic showing the processing steps and the appearance of the used golf ball as it is reprocessed in accordance with the present invention.
Figure 2:
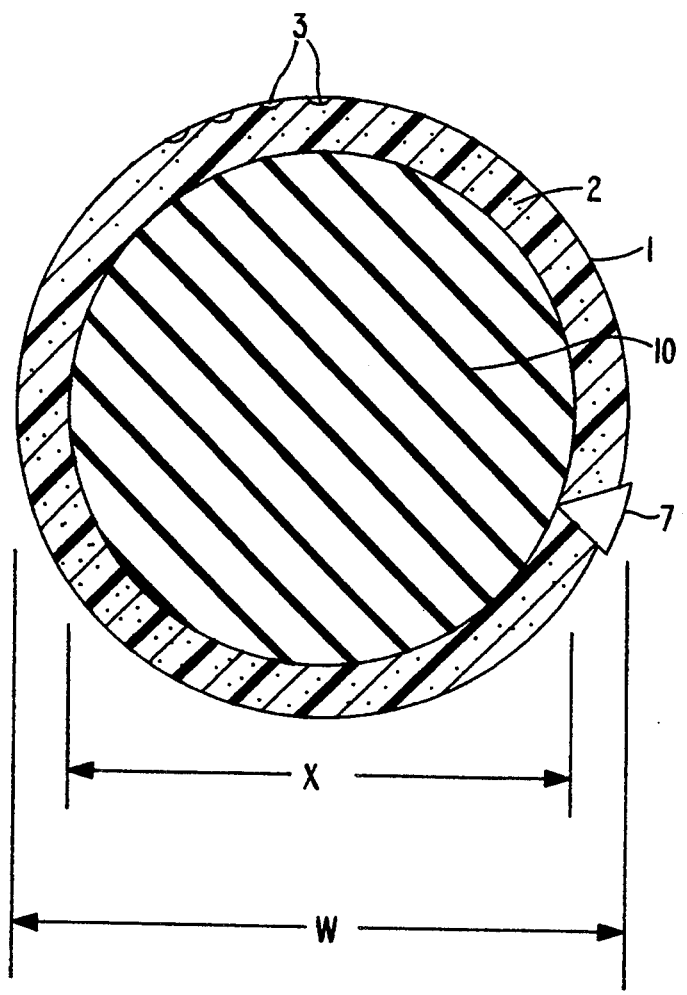
FIG. 2 is a central section through a conventional golf ball prior to reprocessing.

FIG. 1 is a flow chart illustrating processing steps A through G, as well as an illustration of the outer surface of the ball during the various steps of processing. As shown as step A and FIG. 2, a supply of used golf balls 1 will be obtained. Under rules prevailing in the United States, the ball will have an inner one or two piece core 10 having a typical diameter in the order of 1.50 to 1.55 inches, with the total overall diameter of the core 10 and cover 2 being a minimum of 1.68 inches shown as dimension W. Obviously, however, golf balls having components with different dimensions may be used, but preferably the diameter of the original ball will be the same as the diameter of the finished ball.

Also, it is possible that the cover of the ball may be damaged, such as at the area indicated at 7. This would be, however, unusual if the cover of the golf ball was made of an ionomer, which is a cut-proof material, although such covers are nevertheless occasionally damaged. Other types of damage include general wear, discoloring and scratching.

After initial cleaning and drying, shown as step B in FIG. 1, the outer diameter of the ball is reduced to a sufficient degree to allow a new cover to be molded on the reclaimed core.

The outer diameter of the ball may be reduced in any suitable manner, but the preferred method is by compression molding as described below.

In accordance with the compression molding method, the ball is placed in the spherical cavity of a two part or multi-part mold, with the cavity having the desired reduced diameter. The used ball is heated under pressure to cause the thermoplastic cover material to melt and flow out of sprues in the mold, normally located at the mold parting line, such that the excess cover material is in the form of a solidified flashing 6 when the mold has cooled and the ball has been removed form the mold.

Figure 3:
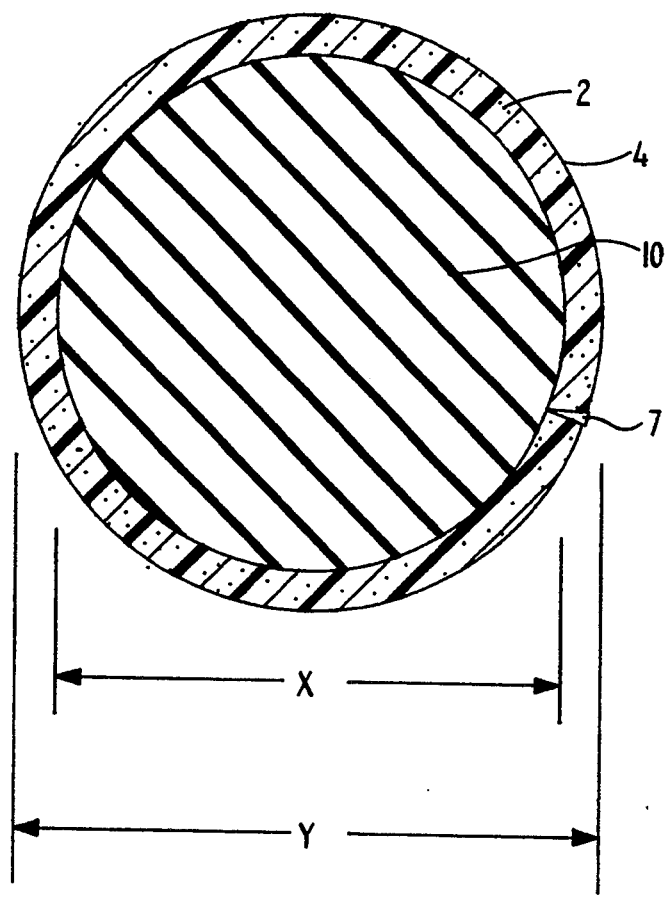
FIG. 3 is a central sectional view through the golf ball of FIG. 2 after thinning of the outer cover has taken place.

Conveniently, a compression mold, which is similar to that used to apply covers on new balls, may be employed for this purpose. For the purpose of diameter reduction, the mold halves are smooth and spherical rather than dimpled. Upon compression molding, the pressure and temperature exerted around the surface of the ball is substantially uniform, and therefore, the cover 4 is thinned uniformly and symmetrically around the central axis of the ball, as shown in FIG. 3. Any imperfections 7 in the cover tend to heal during this process, and it is always possible to fill any cracks or cuts in the ball with a polymer patch prior to compression molding.

If the original outer diameter of the ball is 1.68 inches (W), the diameter is reduced to a degree where preferably there is a thin remaining cover layer of uniform thickness on the ball, since compression molding of the elastomer core itself is not possible. In the specific example shown in FIG. 3, the core diameter (X) of the existing used ball is 1.50 to 1.55 inches, the reduced overall diameter (Y) is in the order of about 1.60 inches, and the remaining thickness of the cover is 0.05 inches or less. Preferably, the amount of cover material removed is in excess of the depth of any dimples on the ball, such that the reduced diameter ball has a smooth outer surface.

In terms of processing conditions, for golf balls having ionomer or modified ionomer covers, the mold is preferably heated to from about 105° C. to about 125° C., and the pressure applied by the hydraulic press acting on the mold is in the order of from about 105 to about 175 kgm per square cm. Heat and pressure are applied until the desired amount cover material has been removed, usually within a few minutes. The mold halves are initially spaced and moved to a closed position as excess cover material has been removed usually within a few minutes. Good results have been obtained at a temperature of 113° C., a pressure of 141 kgm per square cm, and a total time for heating, compressing and cooling of about twelve minutes. Preferably, the compression mold has a large number of cavities arranged in a plurality of rows and lines, and a large number of used balls may be processed at the same time. Steam is circulated around the mold cavities during the heating stage, followed by chilled water in the cooling stage.

The ball shown in FIG. 3 is in effect an intermediate, reduced outer diameter spherical ball having a continuous outer surface 4 composed of cover material. The ball may still have partial dimples, or the cover may be thinned below the depth of the dimples. Upon formation of the new cover over the ball shown in FIG. 3, any imperfections 7 in the surface will be filled, healed, or covered. The thin layer of remaining thermoplastic cover material 4 on the outer surface assures that a good bond will be formed with a new cover.

After compression molding, the mold is cooled, and the balls are removed from the mold. At this stage, any residual flashings or runners due to cover thinning are removed. These can usually be easily removed by hand or machine, and any remaining residue can be removed by light grinding or sanding. In addition, however, the diameter may be further reduced or smoothed by centerless grinding.

As an alternative to compression molding, the cover may be thinned or removed by uniform abrasion of the outer surface of the ball to provide a surface 5 having a reduced diameter as shown in FIG. 1. For example, a centerless grinder, commonly used to grind spherical bearings, billiard balls, or solid golf ball cores may be employed. The grinding method is particularly suitable where the existing cover is not composed of a thermoplastic material, which melts upon heating. For example, some covers are formed from a cured elastomer. In such cases, it is preferable to cool the ball prior to or during grinding, in order to harden the cover and prevent softening and heat damage to the cover during the grinding operation.

The degree of grinding is not critical as long as a sufficient volume or thickness of cover material is removed to enable the convenient formation of a new cover on the ball using conventional methods.

As a less desirable alternative, it is also possible to employ as an intermediate ball, a ball which was originally produced with an overall diameter smaller than standard. For example British balls have an overall diameter of about 1.60 inches, and a new dimpled cover may be molded directly over the existing dimpled cover after suitable cleaning, or removal of outer coatings. In such a case, the overall diameter of the ball has been effectively reduced by a previous manufacturing process.

Figure 4:
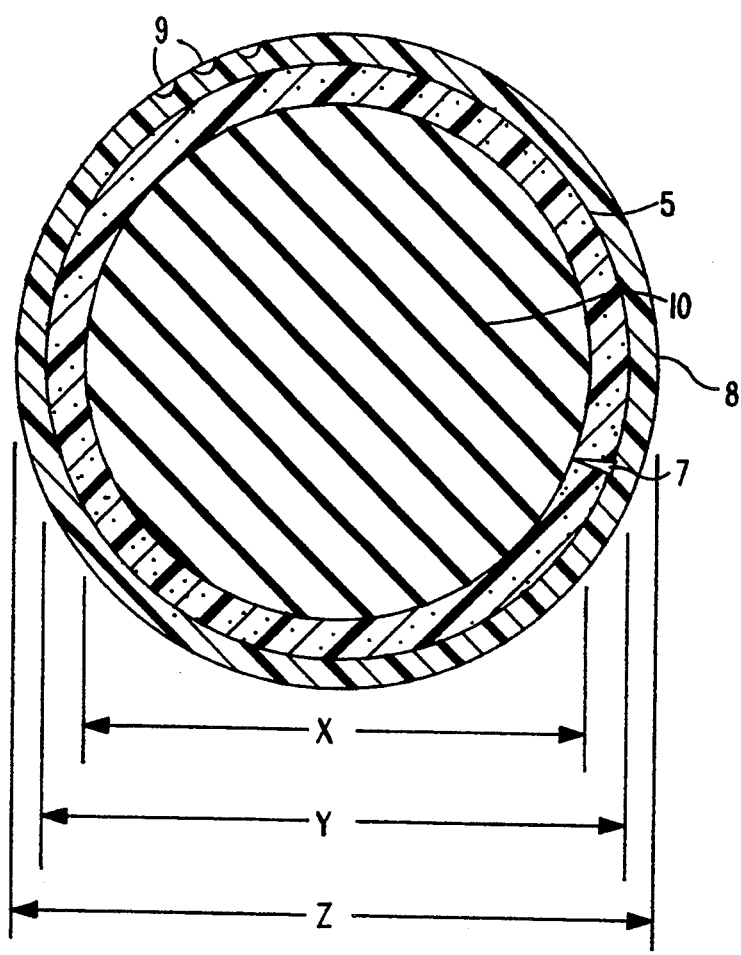
FIG. 4 is a central sectional view through the golf ball similar to FIG. 3, but additionally showing a new cover molded on the intermediate ball of FIG. 3.

A new cover 8 is then applied to the recycled core, as shown in FIGS. 1 and 4. The two methods in current use, compression molding and injection molding, have been described above and are well known. In the formation of the new cover, the spherical mold has the desired final or overall finished diameter of the like-new ball and has convex dimples to impart concave dimples in the cover. Any desired cover color may be used, as well as any desired dimple pattern.

As a specific example of compression molding of a new cover, the semi-spherical cover blanks or shells used to form the outermost cover 8 would be thinner than those normally employed. This represents an additional savings over the production of a conventional ball. Under compression molding conditions, heat and pressure are applied sufficient to melt the new cover material and fuse the new cover around any old thinned cover remaining. As shown in FIG. 4, the ball, upon exit from the mold, will comprise the old core 10 surrounded by a thinned portion of the old cover 5, and a new outer cover 8 having a plurality of dimples 9 and a diameter (Z) which is preferably equal to the original overall diameter (W).

The new cover material may be chosen from any which are commercially available and will normally contain a color pigment, such as white, yellow, orange, or the like. As shown in FIG. 1, steps F and G, the ball is then provided with a logo and other identifying marks, and a clear polyurethane coat is normally applied.

In order to assure good bonding between the new cover and the old thinned cover, the polymers comprising the two are preferable compatible or in the same class. For example, if the thinned cover is composed of an ionomer polymer or blend, the new cover material will be selected from the same or similar ionomer polymer or blend such that fusion and good bonding will occur between the interface of the two covers.

It may be seen that in terms of costs of materials and processing, the ball of the present invention may be produced at a very small fraction of the cost of a new ball. For example, in the case of a new two piece ball, the elastomer for the core must first be formulated together with fillers and other additives. Weighed amounts must then be molded in spherical molds under controlled process conditions. Finished cores may also be subjected to grinding to assure they are spherical. All of these costs are avoided by the present invention. Also, typically much less cover material is needed, which amounts to an additional savings.

I claim:

1. The method of renewing an existing golf ball, said method comprising the steps of:
    a. providing a golf ball in the shape of a first sphere having a solid elastomeric core and an outer dimple thermoplastic cover having a first substantially uniform thickness.
    b. compression molding said golf ball under sufficient heat and pressure to melt and remove from said cover sufficient amount of the cover material in which the dimples are formed to provide an intermediate ball in the shape of a second sphere which is smaller than said first sphere and has a thinned cover of substantially uniform thickness which is less than said first substantially uniform thickness then
    c. molding a new thermoplastic spherical dimpled cover around said intermediate ball under sufficient heat and pressure to fuse said new cover to said thinned cover to form a third sphere substantially equal in size to said first sphere.

2. The method of claim 1 comprising the additional step of applying a clear surface coating to the renewed golf ball after the new cover has been applied.

3. The method of claim 1 wherein the outer dimpled thermoplastic cover of said ball and said new thermoplastic cover comprise an ionomer polymer.

4. The method of claim 1, wherein said intermediate ball has a smooth outer surface.

5. A golf ball produced by the method comprising the steps of any of claims 1, 2, 3, or 4.

* * * * *